United States Patent
Hoffer et al.

(10) Patent No.: US 6,863,148 B2
(45) Date of Patent: Mar. 8, 2005

(54) ROTARY SLIDE VALVE FOR SERVO-ASSISTED STEERING SYSTEMS

(75) Inventors: Andreas Hoffer, Gaildorf (DE); Rainer Schaenzel, Essingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/753,716

(22) Filed: Jan. 8, 2004

(65) Prior Publication Data

US 2004/0154856 A1 Aug. 12, 2004

Related U.S. Application Data

(63) Continuation of application No. PCT/EP02/10164, filed on Sep. 11, 2002.

(30) Foreign Application Priority Data

Sep. 18, 2001 (DE) .......................................... 101 45 903

(51) Int. Cl.$^7$ ............................................. B62D 5/083
(52) U.S. Cl. ...................................... 180/441; 180/426
(58) Field of Search ................................. 180/417, 421, 180/426, 441; 403/293, 324, 365, 366, 379.2, 379.5

(56) References Cited

U.S. PATENT DOCUMENTS 5,357,845 A 10/1994 Sangret
5,511,630 A 4/1996 Kohata et al.
5,842,536 A 12/1998 Birsching

FOREIGN PATENT DOCUMENTS

| DE | 36 34 215 | 4/1987 |
|---|---|---|
| FR | 2 178 379 | 11/1973 |
| JP | 11-208491 | 8/1999 |
| WO | 01/76933 | 10/2001 |

Primary Examiner—Anne Marie Boehler
(74) Attorney, Agent, or Firm—Jordan and Hamburg LLP

(57) ABSTRACT

The invention relates to a rotary slide valve (1) of servo-assisted steering systems for motor vehicles that comprises an input and an output element (3, 4), which can rotate in relation to one another around a limited angle of rotation, and comprises a coupling connection (10) of the output element (4) to a control slide (7). A torque-transmitting, non-distorted coupling connection (10) between the control slide (7) and the output element (4) is provided by a coupling pin (10), which is fixed inside the output element (4) and radially extends into a seat of the control slide (7). The seat axially tapers to a cross-section that matches the cross-section of the coupling pin (10), whereby it is easy to insert the coupling pin (10) into the seat and possible to attain a play-free supporting position for the coupling pin (10) by axially displacing the output element (4) or the coupling pin (10) and control slide (7) in relation to one another.

8 Claims, 2 Drawing Sheets

ROTARY SLIDE VALVE FOR SERVO-ASSISTED STEERING SYSTEMS

BACKGROUND OF THE INVENTION

The invention relates to a rotary slide valve for servo-assisted steering systems of motor vehicles.

In known rotary slide valves of the type mentioned in the introduction (DE 198 08 796 A1), the input element of the valve is connected to the steering column and the output element, which adjoins the steering mechanism, is connected to the input element in a manner which can be twisted as a function of the torque, the input and output elements being coupled via a torsional spring and in a manner with a limited rotational angle. Furthermore, the input element is coaxially and fixedly to a rotary slide so as to rotate with it, the latter for its part forming the guide for a control sleeve which is fixedly connected to the output element so as to rotate with it, so that rotary movements between the input element and output element influence the degree of congruence of crossflow openings which are provided in the rotary slide and control sleeve.

A radial coupling pin serves to fixedly connect the control sleeve to the output element so as to rotate with it, said radial coupling pin being fixed in the output element in the axial region of congruence of the control sleeve and output element and being inserted into a receptacle of the control sleeve during assembly in such a way that there is a connection which is fixed in terms of rotation and as free of play as possible. The coupling pin is configured as a clamping pin and therefore requires a tight tolerance with respect to the receptacle, in order to achieve the aimed at freedom from play with regard to the torques to be transmitted, which makes assembly by radial insertion of the coupling pin into the receptacle with eccentric positioning of the output element with respect to the control sleeve more difficult and necessitates appropriate radial free spaces.

In JP-A-11208491, the receptacle for the coupling pin in the control sleeve tapers axially, starting from an entry cross section of excess dimensions compared with the coupling pin, to a cross section which is smaller than the cross section of the coupling pin and the coupling pin is clamped in a play-free position in the tapered cross-sectional area.

SUMMARY OF THE INVENTION

The invention is based on the object of configuring the coupling connection of the output element and control sleeve for a rotary slide valve of the type mentioned in the introduction to the effect that a spring tensioning device that is as simple and reliable as possible is to be provided in order to support the axial force component and to load the coupling pin in an appropriate manner in the direction of its play-free final assembled position.

According to the invention, there is provided a receptacle for the coupling pin which has a region of excess dimensions compared with the coupling pin and in which the coupling pin, by axial displacement between the output element and control sleeve, can be moved into a region in which there is play-free torque support with correspondingly axial support of the coupling pin. For this purpose, the coupling pin can be designed to be open at the end toward the output element, or also to be closed at the end, so that both axial and radial assembly and insertion of the coupling pin into the receptacle is possible, it being possible to use simple means to achieve the axial clamping to the play-free final position whose cross section is tapered.

The receptacle is expediently configured in such a way that it tapers, axially in the direction of the final position, conically at a small angle, preferably in a wedge shape, so that the torques to be transmitted only result in a small axial force component as a result of the shallow inclination of the surfaces which bound the receptacle in the peripheral direction.

To support this axial force component and appropriately load the coupling pin in the direction of its play-free final assembly position, it proves to be expedient to load the coupling pin in an axially sprung manner, a simple and expedient solution consisting in providing a clamping ring which encloses the control sleeve annularly over at least part of its periphery, said clamping ring being supported firstly axially against the coupling pin and secondly axially against a radial support surface of the control sleeve, and thus being inclined in the direction of the conically tapering part of the receptacle, so that the coupling pin is loaded in the direction of its play-free axial position toward the control sleeve. In an analogous or also supplementary manner to the support surface, it is also possible for the coupling pin to have an appropriately inclined support surface which can be formed, for example, by appropriate chamfering of the coupling pin or also by a conical tapering end of the coupling pin.

For its part, the spring ring can, however, also act on an appropriately wedge-shaped support element or be provided itself with a wedge-shaped contour at least in the region where it overlaps the coupling pin, so that corresponding support forces result. The receptacle can start from the end of the control sleeve, so that it is possible to thread it in axially, or it can also lie at a distance from the closed end of the control sleeve, so that it is only possible to thread it in radially, the threading process then being made easier, however, by the receptacle having a widened cross section in this region compared with the diameter of the coupling pin.

In a further embodiment according to the invention, the coupling pin is clamped axially in a sprung manner in the direction of its play-free position in the tapering part of the receptacle by means of an axial spring, for example an axially extending spring clip, which engages radially outwardly over the coupling pin and is anchored in the control sleeve with its limb which is remote from the coupling pin, for example by inserting said limb into a corresponding radial bore of the control sleeve. The spring clip which engages over the coupling pin and loads it axially can, however, also be formed by an axial projection of a clamping ring or the like, which is assigned a corresponding receiving groove in the outer periphery of the control sleeve.

The sprung clamping means described are advantageous in assembly terms and, in particular if the coupling pin is inserted radially into the receptacle, can already assume their assembled position, as long as the coupling pin or the spring means have run-up slopes which make it possible for the coupling pin to glide on alternate sides when it is being inserted radially.

Further details and features of the invention emerge from the claims. Furthermore, the invention will be explained in the following text in greater detail using exemplary embodiments.

DESCRIPTION OF THE PREFERRED EMBODIMENTS

Figure 1:
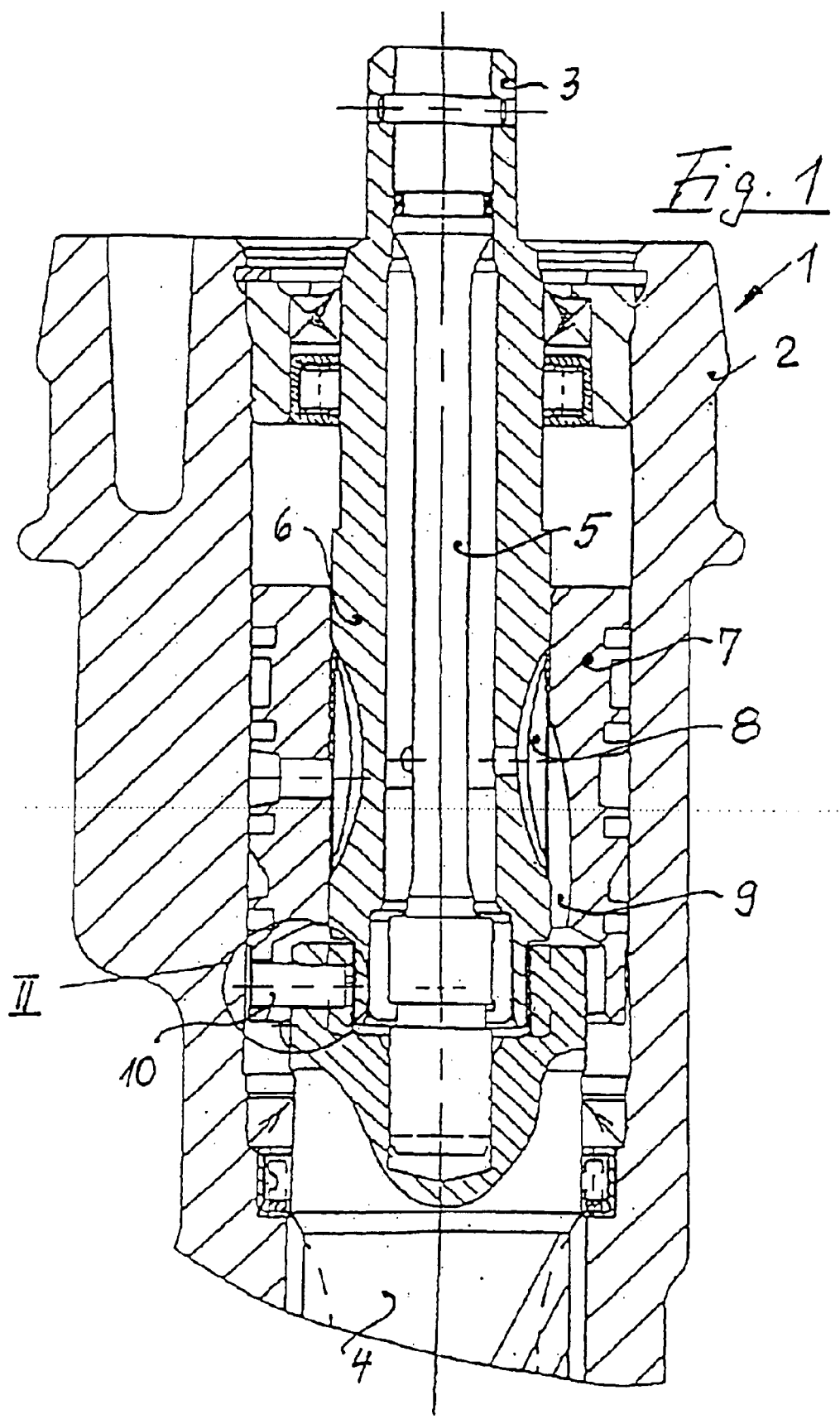
FIG. 1 shows a section of a partially diagrammatic representation of a rotary slide valve, the output element of the rotary slide valve and the control sleeve being connected in a torque-transmitting manner via a coupling pin, and the connection in this respect being shown only in outline.

FIG. 1 shows the fundamental design of a rotary slide valve 1 having a housing 2, in which an input element 3, to be driven from the steering wheel (not shown), and an output element 4 are arranged coaxially, said output element 4 being connected to a steering mechanism and being connected to the input element in a manner which transmits torque via a torsional spring 5, with the rotational angle of the rotatability between the input element 3 and output element 4 being limited. The input element 3 is connected to a rotary slide 6 fixedly so as to rotate with it, in one piece in the exemplary embodiment shown, said rotary slide 6 interacting with a control sleeve 7, the rotary slide 6 and control sleeve 7 having axially extending control grooves 8 and 9 which lie in the same axial region and whose degree of congruence is a function of the rotational angle position of the rotary slide 6 relative to the control sleeve 7. If the rotary slide 6 is fixedly connected to the input element 3 so as to rotate with it, the control sleeve 7 is connected to the output element 4 in an axially congruent region which is shown diagrammatically as detail II in FIG. 2, the connection being diagrammatically illustrated in FIG. 1 by a coupling pin 10 which is fixed in the output element 4 when extended radially and which is assigned a receptacle in the control sleeve 7, of which different variants can be seen in the subsequent FIGS. 2 to 4, said figures each showing only an enlarged detail of the axial overlapping region between the output element 4 and rotary slide 6, in which overlapping region the coupling connection existing between the latter is situated.

Figure 3:
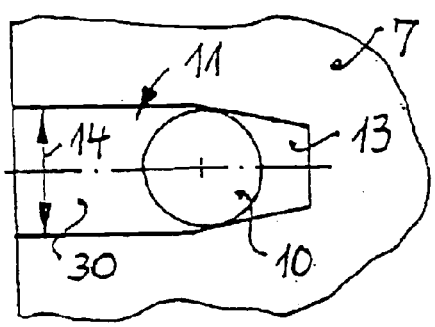
FIG. 3 shows the receptacle, which is assigned to the coupling pin, in the control sleeve in a diagrammatic view according to arrow III in FIG. 2.
Figure 2:
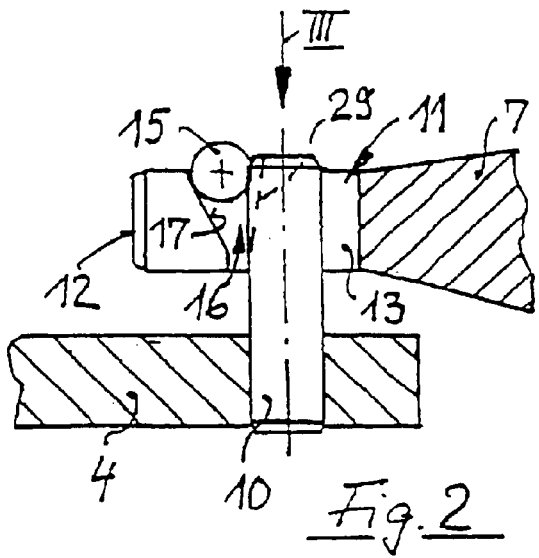
FIG. 2 shows a first embodiment of the torque transmitting connection according to detail II in FIG. 1.
Figure 4:
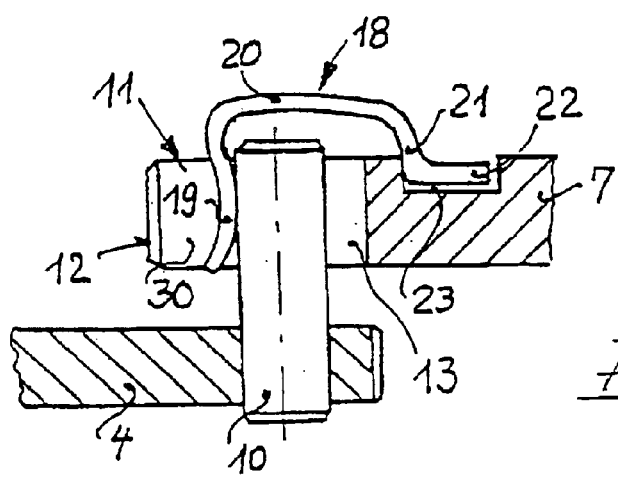
FIG. 4 shows are presentation, corresponding to FIG. 2, in a further refinement of the axial clamping of the coupling pin in the direction of its play-free position within the receptacle.

In the embodiments according to FIGS. 2 to 4, a coupling pin 10 is pressed in each case into the output element 4, said coupling pin 10 extending radially outward in relation to the overall configuration according to FIG. 1 and engaging in the receptacle 11 which, in the illustrations according to FIGS. 2 to 4, is open toward the end 12 of the control sleeve 7 and, in the opposite direction, has a tapering region 13 which, in particular, tapers conically, the width 14, measured in the peripheral direction of the rotary slide 6, of the entry cross section 30 of the receptacle 11 initially being larger, starting from the end 12, than the extent, measured in the same direction, of the coupling pin 10 which is configured, in particular, as a cylindrical pin. Adjoining this region of excess dimensions compared with the coupling pin 10 there follows the tapering region 13, whose width, measured in the peripheral direction, is smaller in a manner tapering in the opposite direction toward the end 12 than the diameter of the coupling pin 10, so that, with the coupling pin 10 lying in the region 13, there is a coupling position, as shown in FIG. 3, in which the coupling pin 10 lies in the receptacle 11 without play in the peripheral direction.

In relation to this position, FIG. 2 illustrates the fixing of the coupling pin 10 by supporting it in the direction toward the tapered end of the region 13 by means of a spring ring 15 which engages around the rotary slide 6 in the peripheral direction at least over the majority of the periphery (which cannot be seen from the drawing) and is assigned, at least in the peripheral region adjacent to the receptacle 11, a groove-like depression 16 which extends in the peripheral direction and has a clamping bevel 17 which runs radially inward toward the coupling pin 10 in such a way that the coupling pin 10 is loaded by the spring ring 15 in the direction of its illustrated, play-free locking position.

The clamping forces which are necessary for this, extend transversely with respect to the coupling pin 10 and are to be applied axially in the longitudinal direction of the receptacle 11 are comparatively small, as the receptacle 11 has only a slight conical shape in the region 13 and accordingly only a small transverse force component results, which has to be absorbed by the spring ring 15 which lies between the clamping bevel 17 and the coupling pin 10.

In the exemplary embodiment, the coupling pin 10 is of continuously cylindrical design. It may, however, be expedient to design the latter to be flattened in the region where the spring ring acts on it or also to design it to taper conically toward the appropriate end, so that a clamping bevel results which corresponds in an opposed manner to the clamping bevel 17, as indicated by dashed lines at 29 in FIG. 2.

The illustrations according to FIGS. 2 to 4 presume that the receptacle 11 is open toward the end 12, which makes it possible to insert the coupling pin 10 axially during assembly of the rotary slide valve 1 in accordance with the displacement of the rotary slide 6 and output element 4 relative to one another.

In a manner deviating from this, it is also possible for the receptacle 11 to be closed toward the end 12 (which is not shown), so that only radial insertion of the coupling pin 10 into the receptacle 11 is possible, and to be precise in conjunction with an appropriate radial mobility between the rotary slide 6 and output element 4. The solution according to the invention is also advantageous in this case, as the inventive design of the receptacle 11 makes radial insertion possible in a region which has excess dimensions compared with the coupling pin, it being possible to compensate for said excess dimensions by the subsequent displacement in the longitudinal direction of the receptacle 11 as a result of its decreasing cross section.

Proceeding from a basic construction as has been explained in the above text using FIGS. 2 and 3, FIG. 4 shows a variant in which, instead of a spring ring 15 according to FIG. 2 which engages around the periphery, use is made of an axially extending spring clamp 18 which loads the coupling pin 10 with one spring limb 19 in the direction of the tapering region 13 of the receptacle 11 and is connected to the rotary slide 6 in the region of its opposite end 21 which is connected by the clip 20 which engages over the coupling pin 10.

Not shown in FIG. 4, the end 21 can be fixed in an insertion opening of the control sleeve 7, so that the spring clamp 18 is a U-shaped clip which is secured, for example, by the spring limb 19 being assigned an undercut region of the coupling pin 10 as contact region.

The spring clamp 18 is shown in FIG. 4 as an arm which projects to a clamping ring 22 extending in the peripheral direction, the clamping ring 22 lying, in the region of the connection of the spring clamp 18, in a groove-like depression which extends in the peripheral direction of the rotary slide 6, and said clamping ring 22 extending over the majority of the periphery of the control sleeve 7.

In a refinement of the invention, it may be expedient to provide an elastic insert between the coupling pin 10 and receptacle 11, said elastic insert being configured, for example, as an elastic sleeve which belongs to the coupling pin 10, is sufficiently hard in relation to the forces to be transmitted and which can contribute to the improvement in sliding friction, so that the degrees of freedom are ensured which are required for the twisting-free guidance of the control sleeve 7 on the rotary slide 6, knocking noises being avoided by means of the sleeve even if play occasionally occurs.

What is claimed is:

1. A rotary slide valve for servo-assisted steering systems of motor vehicles, having an input element and an output element supported by means of a torsional spring and coupled to said input element with a limited rotational angle, and, fixed in terms of rotation to one of said elements, having a rotary slide and a control sleeve which, lying coaxially to one another, are provided with crossflow openings whose degree of congruence can be varied as a function of the rotational angle between the rotary slide and control sleeve and of which the control sleeve has an axial region which engages radially outwardly over the output element, said output element bearing a radial coupling pin which, inserted into a receptacle of the control sleeve, is held in the latter, tensioned by a spring, the receptacle, starting from an entry cross section of excess dimensions in relation to the coupling pin, tapers axially to a cross section region which is smaller than the cross section of the coupling pin, and the coupling pin is clamped into a position without play in the tapered cross sectional region of the receptacle, wherein the coupling pin is clamped axially by a spring ring which extends in the peripheral direction of the control sleeve and is assigned a clamping bevel.

2. The rotary slide valve as claimed in claim 1, wherein that the receptacle is open toward the end of the control sleeve.

3. The rotary slide valve as claimed in claim 1, wherein the receptacle is closed toward the end of the control sleeve.

4. The rotary slide valve as claimed in claim 1, wherein the clamping bevel is assigned to the control sleeve.

5. The rotary slide valve as claimed in claim 4, wherein the clamping bevel is assigned to an annular groove of the control sleeve.

6. The rotary slide valve as claimed in claim 5, wherein the annular groove has a flank which extends in a manner inclined radially inwardly toward the coupling pin as the clamping bevel.

7. The rotary slide valve as claimed in claim 1, wherein the clamping bevel is assigned to the coupling pin.

8. The rotary slide valve as claimed in claim 7, wherein the clamping bevel is formed by a peripheral region of the coupling pin, said coupling pin tapering conically toward the control sleeve.

\* \* \* \* \*